United States Patent
Tsuzuki

(10) Patent No.: US 10,483,049 B2
(45) Date of Patent: Nov. 19, 2019

(54) LITHIUM ION CAPACITOR

(71) Applicant: TAIYO YUDEN CO., LTD., Taito-ku, Tokyo (JP)

(72) Inventor: Takeo Tsuzuki, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 313 days.

(21) Appl. No.: 15/474,399

(22) Filed: Mar. 30, 2017

(65) Prior Publication Data

US 2017/0345583 A1 Nov. 30, 2017

(30) Foreign Application Priority Data

May 30, 2016 (JP) .................. 2016-107992

(51) Int. Cl.
| | |
|---|---|
| *H01G 11/60* | (2013.01) |
| *H01G 11/52* | (2013.01) |
| *H01G 11/74* | (2013.01) |
| *H01G 11/80* | (2013.01) |
| *H01G 11/62* | (2013.01) |
| *H01G 11/64* | (2013.01) |

(52) U.S. Cl.
CPC .............. *H01G 11/60* (2013.01); *H01G 11/52* (2013.01); *H01G 11/62* (2013.01); *H01G 11/64* (2013.01); *H01G 11/74* (2013.01); *H01G 11/80* (2013.01); *Y02E 60/13* (2013.01)

(58) Field of Classification Search
CPC ........ H01G 11/60; H01G 11/64; H01G 11/62; H01G 11/06
See application file for complete search history.

(56) References Cited

U.S. PATENT DOCUMENTS

| | | |
|---|---|---|
| 2011/0045359 A1 | 2/2011 | Schmidt et al. |
| 2017/0207459 A1 | 7/2017 | Okada et al. |
| 2017/0222268 A1* | 8/2017 | Abe ...................... H01G 11/06 |

FOREIGN PATENT DOCUMENTS

| | | | |
|---|---|---|---|
| CN | 102015666 A | | 4/2011 |
| CN | 102544584 A | | 7/2012 |
| CN | 102956357 A | | 3/2013 |
| CN | 103579677 A | | 2/2014 |
| CN | 103682431 A | | 3/2014 |
| CN | 103682432 A | | 3/2014 |
| CN | 104638301 | * | 5/2015 |
| CN | 104638301 A | | 5/2015 |
| EP | 2579378 A1 | | 4/2013 |
| JP | 2001236990 A | | 8/2001 |
| JP | 2003346898 A | | 12/2003 |
| JP | 2015041528 A | | 3/2015 |
| WO | 2016006632 A1 | | 1/2016 |
| WO | WO 2016/009994 | * | 1/2016 |

OTHER PUBLICATIONS

A First Office Action issued by the State Intellectual Property Office of China dated Aug. 20, 2018 for Chinese counterpart application No. 201710166085.4.
A Notification of Reasons for Refusal issued by the Japanese Patent Office, dated Mar. 4, 2019, for related Japanese application No. 2016-107992. (3 pages).
A Notification of Second Office Action issued by the State Intellectual Property Office of China dated May 7, 2019 for Chinese counterpart application No. 201710166085.4. (6 pages).

* cited by examiner

*Primary Examiner* — C Melissa Koslow
(74) *Attorney, Agent, or Firm* — Law Office of Katsuhiro Arai

(57) ABSTRACT

A lithium ion capacitor has an electrolytic solution that contains: an electrolyte which is a mixture of LiFSI and $LiBF_4$, where the mol ratio of LiFSI to $LiBF_4$ is in a range of 90/10 to 30/70; a solvent that contains at least one type of cyclic or chained carbonate compound; and a film-forming agent; wherein the concentration of electrolyte in the electrolytic solution is in a range of 1.2 to 1.8 mol/L. The lithium ion capacitor can maintain its initial high capacitance and low internal resistance, while also undergoing minimal characteristics changes after exposure to a high-temperature, high-voltage environment.

4 Claims, 2 Drawing Sheets

LITHIUM ION CAPACITOR

BACKGROUND

Field of the Invention

The present invention relates to a lithium ion capacitor.

Description of the Related Art

Electrical double-layer capacitors using non-aqueous electrolytic solution offer high electrolytic decomposition voltage of solvent and therefore achieve high voltage resistance, and are able to store a large amount of energy as a result. In particular, lithium ion capacitors have greater capacitance per unit volume than electrical double-layer capacitors, and they also last longer than lithium ion secondary batteries when the discharge depth of their negative electrode is reduced or a polarizing positive electrode material is used. In recent years, there are calls for lithium ion capacitors that achieve lower internal resistance at low temperatures, while ensuring reliability in a high-temperature environment. In terms of characteristics, lithium ion capacitors are subject to rise in internal resistance at low temperatures due to reduced electrolyte dissociation in the electrolytic solution and rise in the viscosity of the electrolytic solution; at high temperatures, their reliability is affected probably due to deterioration in cell characteristics as a result of decomposition of $PF_6^-$ and other anions constituting the electrolyte and consequent generation of hydrogen fluoride and other decomposition products.

To solve the aforementioned problems, Patent Literature 1 proposes a lithium ion battery that uses an electrolytic solution produced by mixing lithium tetrafluoroborate ($LiBF_4$) and lithium bis (pentafluorosulfonyl) imide (LiBETI) at a certain ratio, Patent Literature 2 proposes a lithium ion battery that uses an electrolytic solution whose electrolyte is constituted by lithium hexafluorophosphate ($LiPF_6$) to which $LiBF_4$ has been partly added in order to improve high-temperature storage characteristic, and Patent Literature 3 proposes a lithium ion battery that uses an electrolytic solution whose electrolyte is constituted by $LiBF_4$ to which a small amount of lithium bis (fluorosulfonyl) imide (LiFSI) has been added in order to improve electrical conductivity, for example.

Background Art Literatures

[Patent Literature 1] Japanese Patent Laid-open No. 2001-236990
[Patent Literature 2] Japanese Patent Laid-open No. 2003-346898
[Patent Literature 3] Japanese Patent Laid-open No. 2015-41528

SUMMARY

If an electrolytic solution produced by mixing $LiBF_4$ and LiBETI at a certain ratio is used, as is the case with Patent Literature 1, the high heat resistance of the electrolyte, as well as the high electrical conductivity of LiBETI, will result in improved stability of the electrolytic solution at high temperatures compared to an electrolytic solution that uses $LiPF_6$ as an electrolyte. However, LiBETI causes the current collector foils (aluminum) to corrode when the positive electrode potential is around 4 V (vs. $Li/Li^+$), which presents a problem in terms of long-term reliability. Also, Patent Literature 2 describes an example of using an electrolytic solution produced by mixing $LiBF_4$ into $LiPF_6$, to suppress battery deterioration after storage at high temperatures; however, while such measure may be effective at high temperatures (60° C.) because $LiPF_6$ does not thermally decompose much, it is not expected to improve the reliability of the battery in an environment of 85° C. where the thermal decomposition of $LiPF_6$ occurs to a level that cannot be ignored. On the other hand, Patent Literature 3 discloses a lithium ion battery using an electrolytic solution that has been produced, from $LiBF_4$ (0.30 to 1.65 M) and LiFSI (0.05 to 0.30 M), in such a way that the concentration of lithium salt in the electrolytic solution becomes 0.60 to 1.80 M. However, the electrolytic solution disclosed therein uses an electrolyte which is primarily $LiBF_4$. Having an anion of small ion diameter, $LiBF_4$ interacts strongly with the Li ion and is therefore characterized by a low degree of ion dissociation, which means that this lithium ion battery, although achieving good characteristics, will inevitably cause its internal resistance to rise in a lithium ion capacitor where a large number of ions migrate during charge and discharge.

The inventors of the present invention discovered that, in a lithium ion capacitor where a large number of ions migrate during charge and discharge, predicting how a lithium ion battery would be effective would be difficult based on prior art, as described above.

In light of the foregoing, an object of the present invention is to provide a lithium ion capacitor that maintains its initial high capacitance and low internal resistance, while also undergoing minimal characteristics changes after exposure to a high-temperature, high-voltage environment.

Any discussion of problems and solutions involved in the related art has been included in this disclosure solely for the purposes of providing a context for the present invention, and should not be taken as an admission that any or all of the discussion were known at the time the invention was made.

After studying in earnest, the inventors of the present invention completed the present invention described below.

The lithium ion capacitor proposed by the present invention has an electrolytic solution. The electrolytic solution contains an electrolyte, a solvent, and a film-forming agent. The electrolyte is a mixture of LiFSI and $LiBF_4$, where the mol ratio of LiFSI to $LiBF_4$ is in a range of 90/10 to 30/70. The concentration of electrolyte in the electrolytic solution is in a range of 1.2 to 1.8 mol/L. The solvent contains at least one type of cyclic or chained carbonate compound.

According to the present invention, a lithium ion capacitor whose initial high capacitance and low internal resistance are equal to what can be achieved by prior art, and which also undergoes minimal characteristics changes after exposure to a high-temperature, high-voltage environment, is provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIGS. 1A, 1B, and 1C are schematic views of a lithium ion capacitor in an embodiment of the present invention wherein FIG. 1A is a perspective plan view, FIG. 1B is an exploded view, and FIG. 1C is a section view.

Figure 1A:
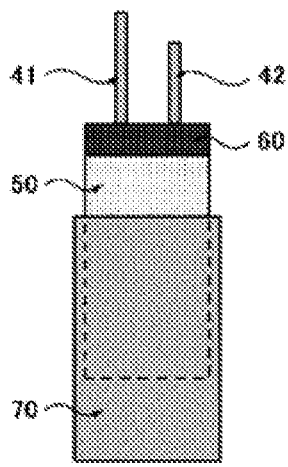

| Description of the Symbols | | | |
|---|---|---|---|
| 10 | Positive electrode, | 11 | Positive-electrode collector, |
| 12 | Positive-electrode layer, | 20 | Negative electrode, |
| 21 | Negative-electrode collector, | 22 | Negative-electrode layer, |
| 30 | Separator, | 41 | Positive-electrode terminal, |
| 42 | Negative-electrode terminal, | 50 | Element, |
| 60 | Rubber seal, | 70 | Outer housing. |

DETAILED DESCRIPTION OF EMBODIMENTS

The present invention is described in detail below by referring to the drawings as deemed appropriate. It should be noted, however, that the present invention is not limited to the embodiment illustrated in any way, and that, because characteristic parts of the invention may be emphasized in the drawings, the scale of each part in a given drawing may not be accurate.

Figure 1B:
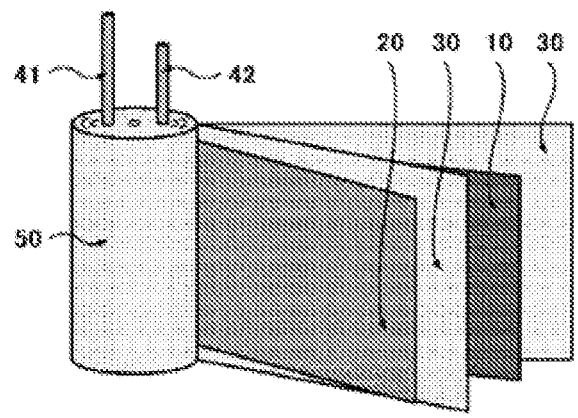
Figure 1C:
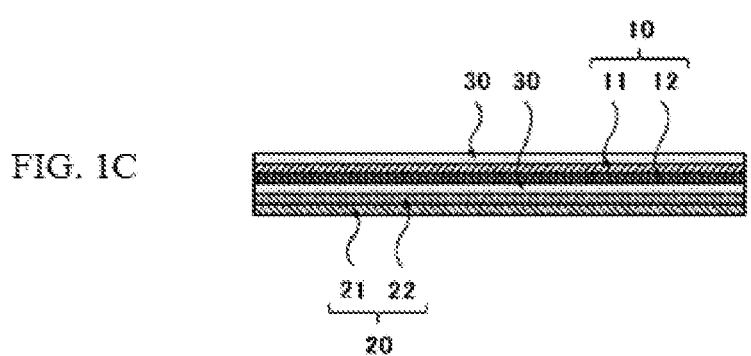

FIGS. 1A, 1B, and 1C provide schematic views of a lithium ion capacitor representing an example of electro-chemical capacitor. FIG. 1A is a perspective plan view, FIG. 1B is an exploded view, and FIG. 1C is a section view. The lithium ion capacitor has, for example, an electric storage element 50 that in turn has a positive electrode 10, a negative electrode 20, and separators 30 separating the positive electrode 10 and negative electrode 20, as well as an outer housing 70 that houses this electric storage element 50. Here, a pair of terminals 41, 42 are connected to the positive electrode 10 and the negative electrode 20, respectively. The terminals 41, 42 are extended to the outside via a rubber seal 60. An electrolytic solution which will be described later is sealed in the container 70, and impregnated into active materials 12, 22 of the positive electrode 10 and negative electrode 20, or into the separators 30. By caulking the rubber seal 60 at the outer housing 70, the air-tightness of the lithium ion capacitor is maintained.

FIG. 1C illustrates a structure where a positive-electrode layer 12 and a negative-electrode layer 22 are placed on one face of a positive-electrode collector 11 and on one face of a negative-electrode collector 21, respectively. Under the present invention, the electrode structure and the like are not limited in any way, and electrode layers may be placed on both faces of each current collector, for example. It should be noted that the lithium ion capacitor is not limited to the cylindrical type as illustrated, and it may be a multilayer type or coin type or have other forms. The shape of the element 50 is not limited in any way, either, and besides having the wound structure as illustrated, the element 50 may have a multilayer structure; while the outer housing 70 may be a square housing.

The separators 30 need only be constituted in a manner preventing multiple electrodes (typically a positive electrode and a negative electrode) from physically contacting each other, and how this contact prevention is embodied is not limited in any way.

Also, preferably the separators 30 are porous so that when the electrolytic solution is held in their pores, conductive paths between the electrodes are formed in a favorable manner. The separator 30 material is not limited in any way, and examples include, but are not limited to, cellulose, polypropylene, polyethylene, fluororesin and other porous materials.

With the lithium ion capacitor of the mode shown in FIGS. 1A, 1B, and 1C, the positive-electrode layer 12 and negative-electrode layer 22 may be respectively formed on the surfaces of the positive-electrode collector 11 and negative-electrode collector 21, each made of a metal foil, via a conductive adhesive or conductive coat layer (not illustrated), if necessary.

For the metal foil used for obtaining each current collector, any sheet-shaped metal exhibiting conductivity can be used without limitation, but it is preferably made of aluminum, copper, or the like. The size, thickness, and other dimensions of the metal foil are not limited in any way, and prior art relating to electro-chemical capacitors can be referenced as deemed appropriate for these dimensions.

For the electrode layers 12, 22, any known structure used in the polarizing electrode layers of lithium ion capacitors may be used. Normally the electrode layers 12, 22 each contain an active material selected from polyaniline (PAN), polyacene semiconductor substance (PAS), active carbon, carbon black, graphite, carbon nanotube, etc., for example. The electrode layers 12, 22 may also each contain any conductive agent, binder, or other component used in the polarizing electrode layers of lithium ion capacitors, as necessary.

The present invention is characterized by the composition of its electrolytic solution.

Preferably the electrolytic solution in the lithium ion capacitor is a non-aqueous electrolytic solution and the electrolytic solution contains an organic solvent and an electrolyte.

Under the present invention, both $LiBF_4$ and LiFSI are used at a certain ratio in the electrolyte. From the viewpoint of demonstrating the effects of the present invention, the total concentration of $LiBF_4$ and LiFSI in the electrolytic solution is in a range of 1.2 to 1.8 mol/L. The mol ratio (X/Y) of LiFSI to $LiBF_4$ is in a range of 90/10 to 30/70. Here, X represents the mol quantity of LiFSI contained in the electrolytic solution, while Y represents the mol quantity of $LiBF_4$ contained in the electrolytic solution. In some embodiments, the electrolyte contains neither $LiPF_6$ nor LiBETI. Depending on the embodiment, the electrolyte may comprise, consist essentially of, or consist of $LiBF_4$ and LiFSI at the above ratio.

As the solvent for electrolytic solution, at least one type of cyclic or chained carbonate compound is contained. Cyclic carbonate compounds include propylene carbonate (PC), ethylene carbonate (EC), and the like, while chained carbonate compounds include dimethyl carbonate (DMC), ethyl methyl carbonate (EMC), diethyl carbonate (DEC), and the like.

Under the present invention, the electrolytic solution further contains a film-forming agent. A film-forming agent can suppress reductive decomposition of the solvent by reductively decomposing itself at a higher potential than that of the solvent, and thereby forming a film, and while examples of film-forming agents include vinylene carbonate (VC) and fluoroethylene carbonate (FEC), for example, the choice is not limited to the foregoing and any material may be used so long as it can act upon the negative electrode and form a stable film. The film-forming agent is contained by 0.5 to 2.0 percent by weight relative to the total quantity of electrolytic solution.

The present invention is not limited in any way, except for the constitution of the electrolytic solution, and prior art may be referenced as deemed appropriate for the shape, manufacturing method, etc., of the lithium ion capacitor. The constitution in the example below can also be referenced.

Example

The present invention is explained in greater detail below using an example. It should be noted, however, that the present invention is not limited to the embodiment of the example.

[Manufacturing Method]

A slurry containing polyacene semiconductor substance (PAS) as an electrode active material, as well as carboxy methyl cellulose and styrene butadiene rubber as a binder, was prepared and this slurry was applied on an aluminum foil to obtain a positive electrode. A negative electrode was produced in sheet shape by preparing a slurry containing non-graphitizing carbon made of phenol resin material, as an active material, as well as carboxy methyl cellulose and styrene butadiene rubber as a binder, and then applying the slurry on a perforated copper foil. Cellulose separators were sandwiched between these electrodes, after which lead terminals were attached to current collectors by means of ultrasonic welding, and they were wound together into an element which was then secured with polyimide-based adhesive tape. A rubber seal was attached to the element thus produced, after which the element was vacuum-dried at approx. 180° C. and then a lithium foil was attached to the negative electrode, and the element was placed in a container. Thereafter, an electrolytic solution which will be described later was poured into the container, and then the rubber seal was caulked, to produce a lithium ion capacitor cell.

[Evaluation Method]

Each lithium capacitor thus obtained was measured for initial characteristics, or specifically the capacitance and internal resistance at room temperature. The capacitance was calculated from the slope of the discharge curve obtained by charging the lithium ion capacitor for 30 minutes at room temperature to 3.8 V at 500 mA using a charge/discharge tester (TOSCAT-3200 manufactured by Toyo System Co., Ltd.), and then discharging it to 2.2 V at 50 mA. The internal resistance was calculated from the voltage drop obtained by charging the lithium ion capacitor for 30 minutes at room temperature to 3.8 V at 140 mA using a charge/discharge tester (TOSCAT-3200 manufactured by Toyo System Co., Ltd.), and then discharging it to 2.2 V at 140 mA.

Thereafter, a float test, involving continuous charging for 1000 hours at a voltage of 3.8 V in a thermostatic chamber adjusted to 85° C., was conducted. After the float test, the cell was let cool to room temperature, and then measured for capacitance and internal resistance. The capacitances and internal resistances after the float test were calculated as percentage values relative to the measured values of initial characteristics (100%).

The constitution of the electrolytic solution for the lithium ion capacitor associated with each manufacturing number is described below.

The manufacturing numbers with an asterisk (*) represent comparative examples.

The following acronyms are used to describe the solvents and electrolytes:

PC—Propylene carbonate
DEC—Diethyl carbonate
DMC—Dimethyl carbonate
EC—Ethylene carbonate
VC—Vinylene carbonate
FEC—Fluoroethylene carbonate The electrolyte concentrations are expressed in units of mol/L, while the additive concentrations are expressed in units of percent by weight.

| Manufacturing No. | Electrolyte | [Mol ratios] | Concentration | Additive, Concentration | Solvent |
|---|---|---|---|---|---|
| *1 | LiFSI/LiBF$_4$ | [10/0] | 1.50 | VC, 1.0 | PC |
| 2 | LiFSI/LiBF$_4$ | [9/1] | 1.50 | VC, 1.0 | PC |
| 3 | LiFSI/LiBF$_4$ | [8/2] | 1.50 | VC, 1.0 | PC |
| 4 | LiFSI/LiBF$_4$ | [7/3] | 1.50 | VC, 1.0 | PC |
| 5 | LiFSI/LiBF$_4$ | [6/4] | 1.50 | VC, 1.0 | PC |
| 6 | LiFSI/LiBF$_4$ | [5/5] | 1.50 | VC, 1.0 | PC |
| 7 | LiFSI/LiBF$_4$ | [4/6] | 1.50 | VC, 1.0 | PC |
| 8 | LiFSI/LiBF$_4$ | [3/7] | 1.50 | VC, 1.0 | PC |
| *9 | LiFSI/LiBF$_4$ | [2/8] | 1.50 | VC, 1.0 | PC |
| *10 | LiFSI/LiBF$_4$ | [6/4] | 1.00 | VC, 1.0 | PC |
| 11 | LiFSI/LiBF$_4$ | [6/4] | 1.20 | VC, 1.0 | PC |
| 12 | LiFSI/LiBF$_4$ | [6/4] | 1.80 | VC, 1.0 | PC |
| *13 | LiFSI/LiBF$_4$ | [6/4] | 2.00 | VC, 1.0 | PC |
| 14 | LiFSI/LiBF$_4$ | [6/4] | 1.50 | VC, 0.5 | PC |
| 15 | LiFSI/LiBF$_4$ | [6/4] | 1.50 | VC, 2.0 | PC |
| 16 | LiFSI/LiBF$_4$ | [6/4] | 1.50 | VC, 3.0 | PC |
| 17 | LiFSI/LiBF$_4$ | [6/4] | 1.50 | FEC, 1.0 | PC |
| 18 | LiFSI/LiBF$_4$ | [6/4] | 1.50 | VC, 1.0 | PC/DEC [1/1] |
| *19 | LiFSI/LiBF$_4$ | [2/8] | 1.50 | VC, 1.0 | EC/DMC [2/3] |
| *20 | LiBF$_4$/LiBETI | [5/5] | 1.00 | — | PC/DMC [1/1] |
| *21 | LiPF$_6$/LiBF$_4$ | [24/1] | 1.25 | — | EC/PC/DMC [1/2/7] |

The evaluation result of the lithium ion capacitor associated with each manufacturing number is described below.

The manufacturing numbers with an asterisk (*) represent comparative examples.

The capacitances and internal resistances in the "Initial" columns represent the measured values of initial characteristics, while the capacitances and internal resistances in the "After float test" columns represent the relative values (%) of the respective characteristics after the float test, with reference to the aforementioned measured values of initial characteristics (100%).

Capacitance [F]
Internal Resistance [mΩ]

| Manufac-turing No. | Initial | | After float test | |
|---|---|---|---|---|
| | Capacitance [F] | Internal resistance [mΩ] | Capacitance [F] | Internal resistance [mΩ] |
| *1 | 40 | 88 | 77 | 228 |
| 2 | 41 | 78 | 81 | 196 |
| 3 | 41 | 73 | 83 | 190 |
| 4 | 42 | 67 | 85 | 183 |
| 5 | 43 | 63 | 86 | 176 |
| 6 | 42 | 71 | 84 | 168 |
| 7 | 41 | 78 | 82 | 161 |
| 8 | 40 | 86 | 80 | 153 |
| *9 | 36 | 102 | 78 | 146 |
| *10 | 21 | 60 | 78 | 180 |
| 11 | 38 | 61 | 82 | 176 |
| 12 | 41 | 84 | 86 | 174 |
| *13 | 42 | 100 | 86 | 172 |
| 14 | 41 | 64 | 82 | 182 |
| 15 | 40 | 76 | 86 | 172 |
| 16 | 39 | 94 | 86 | 170 |
| 17 | 40 | 62 | 85 | 177 |
| 18 | 39 | 53 | 86 | 178 |
| *19 | 32 | 82 | 78 | 184 |
| *20 | 20 | 76 | 82 | 162 |
| *21 | 40 | 68 | 78 | 294 |

The above results are considered. The samples in manufacturing examples 1 to 8, 11, 12, 14 to 18, and 21, showed good values for the initial characteristics of capacitance and internal resistance. As shown in manufacturing example 8, increasing the quantity of LiBF4 in the electrolyte caused the capacitance to decrease and the internal resistance to increase, although the increase and decrease were within an allowable range. On the other hand, manufacturing examples 10 and 13 show that a low concentration of electrolytic solution results in a significant drop in capacitance, while the higher the concentration of electrolytic solution, the higher the viscosity of the solution becomes and the internal resistance increases, as a result.

As for the rate of maintenance of capacitance and rate of change in internal resistance after the float test, adding $LiBF_4$ to the electrolyte tended to improve these rates, as shown in manufacturing examples 2 to 9. Also, additive quantities of 0.5 percent by weight and higher resulted in clear improvements of properties after the float test. When the additive quantity reached around 2 percent, however, the improvement in float reliability plateaued and further increasing the additive only caused the initial internal resistance to increase.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-107992, filed May 30, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A lithium ion capacitor having an electrolytic solution that contains:
   an electrolyte which is a mixture of LiFSI and $LiBF_4$ which are the only lithium salts used as the electrolyte, where the mol ratio of LiFSI to $LiBF_4$ is in a range of 90/10 to 30/70;
   a solvent that contains at least one cyclic or chained carbonate compound; and
   a film-forming agent which suppresses reductive decomposition of the solvent by reductively decomposing itself at a potential higher than that of the solvent, thereby forming a film on a negative electrode;
   wherein a concentration of electrolyte in the electrolytic solution is in a range of 1.2 to 1.8 mol/L.

2. A lithium ion capacitor according to claim 1, wherein the film-forming agent contains at least one of vinylene carbonate and fluoroethylene carbonate.

3. A lithium ion capacitor according to claim 1, wherein a concentration of the film-forming agent in the electrolytic solution is in a range of 0.5 to 2.0 percent by weight.

4. A lithium ion capacitor according to claim 2, wherein a concentration of the film-forming agent in the electrolytic solution is in a range of 0.5 to 2.0 percent by weight.

* * * * *